Oct. 6, 1931.  W. E. McCLEARY  1,826,320

TUBE FRAME FOR AXMINSTER LOOMS

Filed Jan. 14, 1930

INVENTOR
WM. E. McCLEARY
Southgate Fay & Hawley
ATTORNEYS

Patented Oct. 6, 1931

1,826,320

UNITED STATES PATENT OFFICE

WILLIAM E. McCLEARY, OF WORCESTER, MASSACHUSETTS, ASSIGNOR TO CROMPTON & KNOWLES LOOM WORKS, OF WORCESTER, MASSACHUSETTS, A CORPORATION OF MASSACHUSETTS

TUBE FRAME FOR AXMINSTER LOOMS

Application filed January 14, 1930. Serial No. 420,769.

This invention relates to tube frames for Axminster looms, and it is the general object of the invention to provide a simple and durable form of chain engaging latch formed preferably of resilient material and held to the tube frame bracket by improved means.

Tube frames are customarily held to the transporting chains by some form of latch or hook which is disengaged from the chain when the frame is to be moved to tuft forming position. A great many of these latches have been formed of two leaf springs held at their lower ends to the tube frame by screws. It is an important object of my invention to secure one of these springs in position by screws and to position the other spring by wings or flanges formed on the first spring.

It is a further object of my invention to form the inner spring member with a bent lower end to extend into a slot or opening in the tube frame bracket to prevent relative movement between either leaf spring and the bracket.

With these and other objects in view which will appear as the description proceeds, the invention resides in the combination and arrangement of parts hereinafter described and claimed.

Figure 1:
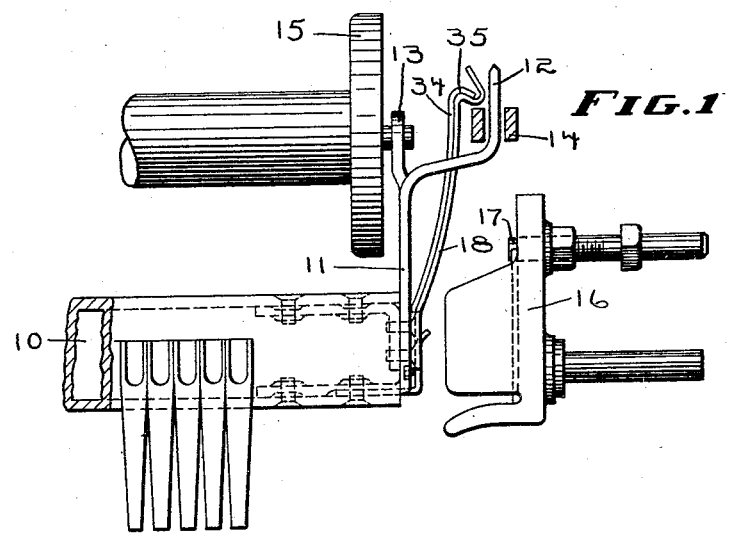
Figure 4:
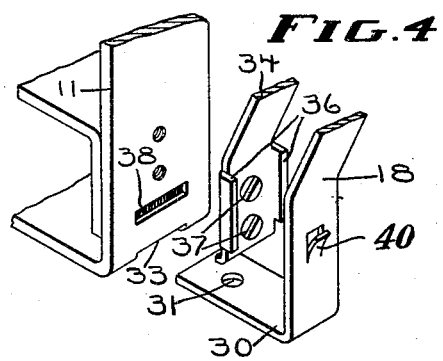
Figure 2:
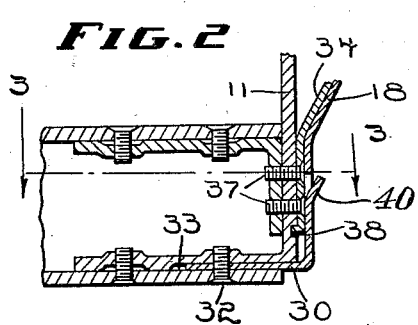
Figure 3:
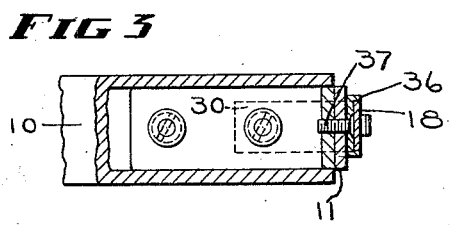

In the accompanying drawings, wherein I have shown a convenient embodiment of my invention, Fig. 1 is a front elevation of one end of a tube frame having my invention attached thereto, the operating clutch being spaced from the tube frame, Fig. 2 is a vertical section taken longitudinally through the frame, Fig. 3 is a detail horizontal section on line 3—3 of Fig. 2, and Fig. 4 is a perspective view of certain parts detached and suggesting the manner of their assembly.

Referring to Fig. 1, I have shown a hollow tubular bar 10 having a bracket 11 formed with a chain engaging arm 12 and a spool bearing 13. A transporting chain 14 is given regular periodic movements by means not shown to advance the tube frames one at a time to transfer position. The spool 15 is to be wound with the variously colored yarns determining the pattern of the fabric to be woven. A clutch 16 is suitably mounted and moves from the position shown in Fig. 1 inwardly toward the bracket. A stud 17 engages the outer leaf spring 18 and bends it toward the spool bearing as the clutch, moves toward the tube frame.

My improvement relates to the lower end of the spring and in carrying my invention into effect I bend the bottom of leaf 18 inwardly as at 30 and provide the same with a hole 31 through which extends a securing screw 32 which holds the bracket to the tubular bar. The bent end 30 may lie in a groove 33 in the bracket, although this construction is not necessary. Leaf 18 may be further provided with a struck out tongue 40 to lie under the stud 17 of the clutch.

Upon improper operation of the tube frame and the descending movement of the clutch 16, engagement between the stud 17 of the clutch and tongue 40 of the frame will prevent a falling of the tube frame and through other mechanisms which are well known in the art a stoppage of the loom will take place.

The hook is formed with a second or bracing leaf spring 34 extending as usual along the upper part of the leaf 18 and reinforcing the same and forming therewith a double chain engaging hook 35. The lower end of the leaf 34 has the sides thereof bent to form parallel wings 36 between which extends the leaf 18. A pair of holding screws 37 extend through the leaf 34 between the wings and are threaded into the bracket. The outer spring 18 prevents loosening of the holding screws, and thereby insures retention of the spring hook or latch on the bracket.

The bottom of the inner spring 34 is bent horizontally to form a toe which extends into a slot or groove 38 located in the outer face of the bracket. The toe prevents twisting of the leaf 34 and thereby strengthens both leaves of the latch.

Should the longer outer hook 18 break, its renewal may be easily effected without removing either the bracket or the inner leaf 34 from the tube frame.

From the foregoing it will be seen that I have provided a tube frame with a resilient latch formed of two parts, one of which, preferably the inner, has portions to engage and restrain twisting of the other part. Also, the inner leaf enters the bracket to prevent relative angular motion of the bracket and said inner leaf independently of the holding screws 37. Furthermore, the outer leaf prevents loosening of the screws 37 and also enters the tube frame to be held tightly against twisting independently of the wings.

Having thus described my invention it will be apparent that changes and modifications may be made therein by those skilled in the art without departing from the spirit and scope of the invention and I do not wish to be limited to the details herein disclosed, but what I claim is:

1. In an Axminster tube frame having a longitudinal bar and a chain engaging bracket carried by the bar, a chain engaging hook formed of two resilient members one of which is secured directly to the bracket and having spaced wings transverse of the bar and the other member held to the bar and being located between said wings and restrained thereby against angular movement with respect to the first member in a direction transverse of the bar.

2. In an Axminster tube frame having a longitudinal bar and a chain engaging bracket carried by the bar, a chain engaging latch formed of two resilient members, a pair of wings formed on one of said members, the other member engaging said wings to be held thereby against relative movement angularly in a direction transverse of the bar with respect to the said one member, and means to secure each of said members to the bar independently of each other.

3. In an Axminster tube frame having a longitudinal bar and a chain engaging bracket carried by the bar, a chain engaging hook formed of two resilient members, a pair of spaced wings formed on one of said members, and attaching means between said wings to secure said one member to the bracket, the other member being secured to the bar and held by the wings against movement in a plane transverse of the bar, said other member holding the attaching means in position to prevent loosening thereof.

4. In an Axminster tube frame having a longitudinal bar and a chain engaging bracket carried by the bar, a chain engaging latch formed of two resilient members, one of said members having spaced wings on opposite sides thereof which project in planes parallel to the axis of the bar and attaching screws located between the wings and securing said one member to the bracket, the other member having the lower end thereof extending into the bar and secured therein, said other member extending between the wings to be restrained by the latter against movement in a plane transverse of the bar and engaging the screws to prevent loosening thereof.

5. In an Axminster tube frame having a longitudinal bar and a chain engaging bracket carried by the bar, a chain engaging latch formed of two resilient members, one of the members being held directly to the bracket and the other members held to the bar, each member having the lower end thereof bent inwardly to engage a portion of the bracket and be thereby restrained against angular movement in a plane transverse of the axis of the bar, and the members having interengaging portions to prevent relative angular movement of the members in a plane transverse of the bar.

6. In an Axminster tube frame having a longitudinal bar and a chain engaging bracket carried by the bar, a chain engaging hook formed of a pair of resilient members each of which has the lower end bent inwardly toward the bar, one of the members being held directly to the bracket and the other member held to the bar, wings formed on one of said members to engage the other member and prevent relative angular movement between said members in a plane transverse of the bar, the bent ends engaging the bracket to prevent relative movement of said members with respect to the bracket in a direction transverse of the bar.

7. In an Axminster tube frame having a longitudinal bar and a chain engaging bracket carried by the bar, a chain engaging hook formed of a pair of resilient members each of which has the lower end bent inwardly toward the bar, wings formed on one of said members to engage the other member and prevent relative angular movement between said members in a plane transverse of the bar, the bent ends engaging the bracket to prevent relative movement of said members with respect to the bracket in a direction transverse of the bar, and attaching screws to hold one of said members to the bracket, said screws being engaged by the other member to prevent loosening thereof, said other member being held between the bar and bracket by a securing means.

8. In an Axminster tube frame having a longitudinal bar and a chain engaging bracket carried by the bar, a chain engaging latch formed of two resilient members, means to secure one of the members to the bracket independent of the other member and to prevent angular movement thereof relatively to the bracket in a direction transverse of the bar, additional means to hold the other member to the bar from movement in a horizonal plane and said members having interengaging parts to prevent relative angular movement between said members in a plane transverse of the bar.

In testimony whereof I have hereunto affixed my signature.

WILLIAM E. McCLEARY.